United States Patent
Yang et al.

(10) Patent No.: US 10,499,392 B2
(45) Date of Patent: Dec. 3, 2019

(54) METHOD AND APPARATUS FOR RESOURCE ALLOCATION

(71) Applicant: ZTE Corporation, Shenzhen, Guangdong (CN)

(72) Inventors: Weiwei Yang, Guangdong (CN); Bo Dai, Guangdong (CN); Chunli Liang, Guangdong (CN); Shuqiang Xia, Guangdong (CN); Zhaohua Lu, Guangdong (CN)

(73) Assignee: ZTE Corporation, Shenzhen (CN)

( * ) Notice: Subject to any disclaimer, the term of this patent is extended or adjusted under 35 U.S.C. 154(b) by 26 days.

(21) Appl. No.: 15/990,546

(22) Filed: May 25, 2018

(65) Prior Publication Data

US 2018/0279285 A1    Sep. 27, 2018

Related U.S. Application Data

(63) Continuation of application No. PCT/CN2017/072249, filed on Jan. 23, 2017.

(30) Foreign Application Priority Data

Jan. 8, 2016 (CN) .......................... 2016 1 0015588
Feb. 5, 2016 (CN) .......................... 2016 1 0082070

(51) Int. Cl.
    *H04W 72/04*    (2009.01)
(52) U.S. Cl.
    CPC ....... *H04W 72/044* (2013.01); *H04W 72/042* (2013.01)

(58) Field of Classification Search
    None
    See application file for complete search history.

(56) References Cited

U.S. PATENT DOCUMENTS

2011/0044261 A1* 2/2011 Cai ........................ H04L 5/0053
                                                    370/329
2013/0114472 A1* 5/2013 Tamaki ................... H04L 5/001
                                                    370/280

(Continued)

FOREIGN PATENT DOCUMENTS

CN       102427396 A     4/2012
CN       102468950 A     5/2012

(Continued)

OTHER PUBLICATIONS

International Search Report and Written Opinion dated Mar. 29, 2017 for International Application No. PCT/CN2017/072249, filed on Jan. 23, 2017 (9 pages).

*Primary Examiner* — Brian S Roberts
(74) *Attorney, Agent, or Firm* — Perkins Coie LLP

(57) ABSTRACT

The present disclosure provides a method and an apparatus for resource allocation. The method for resource allocation includes: allocating, by a base station, resources for Physical Uplink Shared Channel (PUSCH) for a User Equipment (UE) in accordance with a predefined resource allocation scheme; and transmitting, by the base station, a resource allocation result to the UE via Downlink Control Information (DCI). With the embodiments of the present disclosure, it is possible to allocation resources for PUSCH, thereby solving the problem in the related art associated with lack of allocation scheme.

22 Claims, 1 Drawing Sheet

(56) References Cited

U.S. PATENT DOCUMENTS

2016/0066282 A1\* 3/2016 Ouchi ................. H04L 5/00
                                                                                              455/522
2016/0066343 A1   3/2016 Lin et al.
2017/0164384 A1\* 6/2017 Wang ............... H04W 72/1289

FOREIGN PATENT DOCUMENTS

| CN | 102652404 A | 8/2012 |
| CN | 102934381 A | 2/2013 |
| CN | 104113924 A | 10/2014 |
| WO | 2011/152673 A2 | 12/2011 |

\* cited by examiner

METHOD AND APPARATUS FOR RESOURCE ALLOCATION

CROSS REFERENCE TO RELATED APPLICATIONS

This patent document is a continuation of and claims priority to International Patent Application No. PCT/CN2017/072249, filed on Jan. 23, 2017, which further claims the benefits of and priorities of Chinese Patent Application No. 201610015588.7, filed on Jan. 8, 2016 and Chinese Patent Application No. 201610082070.5, filed on Feb. 5, 2016. The entire contents of the before-mentioned patent applications are incorporated by reference as part of the disclosure of this document.

TECHNICAL FIELD

The present disclosure relates to, but not limited to, communication technology, and more particularly, to a method and an apparatus for resource allocation.

BACKGROUND

Machine Type Communication (MTC), also referred to as Machine to Machine (M2M), is currently a main form of application of the Internet of Things (IoT) technology. Currently available MTC devices are mainly based on Global System of Mobile communication (GSM) system. Recently, more and more mobile operators have chosen Long Term Evolution (LTE)/Long Term Evolution Advanced (LTE-A) as evolutions towards further broadband wireless communication systems due to their high spectral efficiency. Various MTC data services based on LTE/LTE-A will be more attractive.

In the 3rd Generation Partnership Project (3GPP) Technical Report (TR) 45.820 V200, several techniques applicable to Comb-Internet of Things (C-IoT) have been disclosed, among which Narrow Band-Internet of Things (NB-IoT) is the most attractive one. The NB-IoT system has a system bandwidth of 200 kHz, which is the same as the channel bandwidth of the GSM system. This makes it very convenient for the NB-IoT system to reuse GSM spectrums and reduce interference with neighboring GSM channels.

For an IoT User Equipment (UE), currently only transmission of Physical Uplink Shared Channel (PUSCH) is supported in the uplink. Both single-tone and multi-tone PUSCH transmissions can be supported. There is currently no effective solution to the problem associated with PUSCH resource allocation.

SUMMARY

A summary of the subject matters described in the present disclosure will be given below. The scopes of the claims are not limited to the summary.

The embodiments of the present disclosure provide a method and an apparatus for resource allocation, capable of allocating resources for PUSCH.

In a first aspect, a method for resource allocation is provided according to an embodiment of the present disclosure. The method includes: allocating, by a base station, resources for Physical Uplink Shared Channel (PUSCH) for a User Equipment (UE) in accordance with a predefined resource allocation scheme; and transmitting, by the base station, a resource allocation result to the UE via Downlink Control Information (DCI).

In an exemplary embodiment, the predefined resource allocation scheme includes: a first scheme in which a time-domain length of a PUSCH transmission is a predetermined fixed time length, or a second scheme in which the time-domain length of the PUSCH transmission is not the predetermined fixed time length.

In an exemplary embodiment, when the predefined resource allocation scheme is the first scheme, the predetermined fixed time length is N*V ms, where N is a positive integer having a value agreed by the base station and the UE in advance, and V has a value of 8, 10 or 12.

In an exemplary embodiment, when the predefined resource allocation scheme is the first scheme, the DCI includes information indicating a frequency-domain start position and a frequency-domain size of the PUSCH transmission.

In an exemplary embodiment, when the predefined resource allocation scheme is the second scheme, the DCI includes information indicating a frequency-domain start position and a frequency-domain size of the PUSCH transmission, and information indicating the time-domain length of the PUSCH transmission.

In an exemplary embodiment, when the predefined resource allocation scheme is the second scheme, the DCI includes information indicating a frequency-domain start position and a frequency-domain size of the PUSCH transmission, and information indicating a number of time-domain units corresponding to the PUSCH transmission. The time-domain unit is predefined, configured via high layer signaling or determined based on a predetermined correspondence with a number of sub-carriers.

In an exemplary embodiment, the DCI includes information indicating a time-domain offset of the PUSCH transmission.

In an exemplary embodiment, when the predefined resource allocation scheme is the second scheme, the DCI includes information indicating a time-domain offset of the PUSCH transmission, information indicating the frequency-domain start position and the frequency-domain size, and information indicating the time-domain length of the PUSCH transmission.

In an exemplary embodiment, when the predefined resource allocation scheme is the second scheme, the DCI includes information indicating a time-domain offset of the PUSCH transmission, information indicating the frequency-domain start position and the frequency-domain size, and information indicating a number of time-domain units corresponding to the PUSCH transmission.

In an exemplary embodiment, the information indicating the frequency-domain start position and the frequency-domain size of the PUSCH transmission is represented by X bits in the DCI.

In an exemplary embodiment, the information indicating the frequency-domain start position and the frequency-domain size of the PUSCH transmission is represented by X bits in the DCI, and the information indicating the time-domain length of the PUSCH transmission is represented by Y bits in the DCI. Alternatively, the information indicating the frequency-domain start position and the frequency-domain size of the PUSCH transmission and the information indicating the time-domain length of the PUSCH transmission is represented by P bits in the DCI.

In an exemplary embodiment, the information indicating the frequency-domain start position and the frequency-domain size of the PUSCH transmission is represented by X bits in the DCI, and the information indicating the number of time-domain units corresponding to the PUSCH transmission is represented by Z bits in the DCI. Alternatively, the information indicating the frequency-domain start position and the frequency-domain size of the PUSCH transmission and the information indicating the number of time-domain units corresponding to the PUSCH transmission is represented by Q bits in the DCI.

In an exemplary embodiment, the information indicating the time-domain offset of the PUSCH transmission and the information indicating the frequency-domain start position and the frequency-domain size is represented by S bits in the DCI, where S in a positive integer, and the information indicating the time-domain length of the PUSCH transmission is represented by Y bits in the DCI, where Y is a positive integer.

In an exemplary embodiment, the information indicating the time-domain offset of the PUSCH transmission and the information indicating the frequency-domain start position and the frequency-domain size is represented by S bits in the DCI, where S in a positive integer, and the information indicating the number of time-domain units corresponding to the PUSCH transmission is represented by Z bits in the DCI.

In an exemplary embodiment, a value of the X bits is determined based on at least one of: a predetermined correspondence between a combination of the frequency-domain start position and the frequency-domain size of the PUSCH transmission and the value of the X bits, and a value of $X_1$ bits among the X bits for indicating the frequency-domain start position of the PUSCH transmission and a value of $X_2$ bits among the X bits for indicating the frequency-domain size of the PUSCH transmission, where $X_1$ and $X_2$ are both positive integers.

In an exemplary embodiment, a value of the Y bits is determined based on at least one of: a minimum number of schedulable sub-carriers, a size of a largest schedulable transport block, and a maximum number of schedulable resource elements.

In an exemplary embodiment, a value of the P bits is dependent on a value of the X bits and a value of the Y bits.

In an exemplary embodiment, a value of the Z bits is determined based on at least one of: a minimum time-domain unit, a minimum number of schedulable sub-carriers, a size of a largest schedulable transport block, and a maximum number of schedulable resource elements.

In an exemplary embodiment, a value of the Q bits is dependent on a value of the X bits and a value of the Z bits.

In an exemplary embodiment, the maximum number of schedulable resource elements is N*M, where M is a number of resource elements for data transmission in one Physical Resource Block (PRB), and N has a predetermined value of 5, 6, 10 or 12.

In an exemplary embodiment, the information indicating the time-domain offset of the PUSCH transmission is represented by B bits in the DCI, where B is a positive integer. The time-domain offset is a number, L, of time-domain units, where L is non-negative. The time-domain unit is predefined, configured via high layer signaling or determined based on a predetermined correspondence with a number of sub-carriers.

In an exemplary embodiment, the predefined resource allocation scheme includes a predetermined subframe index of a start subframe of a PUSCH transmission being a multiple of time-domain units. The time-domain unit is predefined, configured via high layer signaling or determined based on a predetermined correspondence with a number of sub-carriers.

In an exemplary embodiment, the DCI includes information indicating a time-domain offset of the PUSCH transmission and information indicating the frequency-domain start position and the frequency-domain size.

In an exemplary embodiment, the information indicating the time-domain offset of the PUSCH transmission and the information indicating the frequency-domain start position and the frequency-domain size is represented by S bits in the DCI, where S in a positive integer.

In a second aspect, an apparatus for resource allocation is provided according to an embodiment of the present disclosure. The apparatus includes: an allocation module configured to allocate resources for Physical Uplink Shared Channel (PUSCH) for a User Equipment (UE) in accordance with a predefined resource allocation scheme; and a transmission module configured to transmit a resource allocation result to the UE via Downlink Control Information (DCI).

In an exemplary embodiment, the predefined resource allocation scheme includes: a first scheme in which a time-domain length of a PUSCH transmission is a predetermined fixed time length, or a second scheme in which the time-domain length of the PUSCH transmission is not the predetermined fixed time length.

In an exemplary embodiment, when the predefined resource allocation scheme is the first scheme, the predetermined fixed time length is N*V ms, where N is a positive integer having a value agreed by the base station and the UE in advance, and V has a value of 8, 10 or 12.

In an exemplary embodiment, when the predefined resource allocation scheme is the first scheme, the DCI includes information indicating a frequency-domain start position and a frequency-domain size of the PUSCH transmission.

In an exemplary embodiment, when the predefined resource allocation scheme is the second scheme, the DCI includes information indicating a frequency-domain start position and a frequency-domain size of the PUSCH transmission, and information indicating the time-domain length of the PUSCH transmission.

In an exemplary embodiment, when the predefined resource allocation scheme is the second scheme, the DCI includes information indicating a frequency-domain start position and a frequency-domain size of the PUSCH transmission, and information indicating a number of time-domain units corresponding to the PUSCH transmission. The time-domain unit is predefined, configured via high layer signaling or determined based on a predetermined correspondence with a number of sub-carriers.

In an exemplary embodiment, the DCI includes information indicating a time-domain offset of the PUSCH transmission.

In an exemplary embodiment, the information indicating the frequency-domain start position and the frequency-domain size of the PUSCH transmission is represented by X bits in the DCI.

In an exemplary embodiment, the information indicating the frequency-domain start position and the frequency-domain size of the PUSCH transmission is represented by X bits in the DCI, and the information indicating the time-domain length of the PUSCH transmission is represented by Y bits in the DCI. Alternatively, the information indicating the frequency-domain start position and the frequency-domain size of the PUSCH transmission and the information indicating the time-domain length of the PUSCH transmission is represented by P bits in the DCI.

In an exemplary embodiment, the information indicating the frequency-domain start position and the frequency-domain size of the PUSCH transmission is represented by X bits in the DCI, and the information indicating the number of time-domain units corresponding to the PUSCH transmission is represented by Z bits in the DCI. Alternatively, the information indicating the frequency-domain start position and the frequency-domain size of the PUSCH transmission and the information indicating the number of time-domain units corresponding to the PUSCH transmission is represented by Q bits in the DCI.

In an exemplary embodiment, a value of the X bits is determined based on at least one of: a predetermined correspondence between a combination of the frequency-domain start position and the frequency-domain size of the PUSCH transmission and the value of the X bits, and a value of $X_1$ bits among the X bits for indicating the frequency-domain start position of the PUSCH transmission and a value of $X_2$ bits among the X bits for indicating the frequency-domain size of the PUSCH transmission, where $X_1$ and $X_2$ are both positive integers.

In an exemplary embodiment, a value of the Y bits is determined based on at least one of: a minimum number of schedulable sub-carriers, a size of a largest schedulable transport block, and a maximum number of schedulable resource elements.

In an exemplary embodiment, a value of the P bits is dependent on a value of the X bits and a value of the Y bits.

In an exemplary embodiment, a value of the Z bits is determined based on at least one of: a minimum time-domain unit, a minimum number of schedulable sub-carriers, a size of a largest schedulable transport block, and a maximum number of schedulable resource elements.

In an exemplary embodiment, a value of the Q bits is dependent on a value of the X bits and a value of the Z bits.

In an exemplary embodiment, the maximum number of schedulable resource elements is N*M, where M is a number of resource elements for data transmission in one Physical Resource Block (PRB), and N has a predetermined value of 5, 6, 10 or 12.

In an exemplary embodiment, the information indicating the time-domain offset of the PUSCH transmission is represented by B bits in the DCI, where B is a positive integer. The time-domain offset is a number, L, of time-domain units, where L is non-negative. The time-domain unit is predefined, configured via high layer signaling or determined based on a predetermined correspondence with a number of sub-carriers.

In a third aspect, an apparatus for resource allocation is provided according to an embodiment of the present disclosure. The apparatus includes a processor and a memory storing instructions executable by the processor whereby the processor is operative to: allocate resources for Physical Uplink Shared Channel (PUSCH) for a User Equipment (UE) in accordance with a predefined resource allocation scheme; and transmit a resource allocation result to the UE via Downlink Control Information (DCI).

In an exemplary embodiment, the predefined resource allocation scheme includes: a first scheme in which a time-domain length of a PUSCH transmission is a predetermined fixed time length, or a second scheme in which the time-domain length of the PUSCH transmission is not the predetermined fixed time length.

In an exemplary embodiment, when the predefined resource allocation scheme is the first scheme, the predetermined fixed time length is N*V ms, where N is a positive integer having a value agreed by the base station and the UE in advance, and V has a value of 8, 10 or 12.

In an exemplary embodiment, when the predefined resource allocation scheme is the first scheme, the DCI includes information indicating a frequency-domain start position and a frequency-domain size of the PUSCH transmission.

In an exemplary embodiment, when the predefined resource allocation scheme is the second scheme, the DCI includes information indicating a frequency-domain start position and a frequency-domain size of the PUSCH transmission, and information indicating the time-domain length of the PUSCH transmission.

In an exemplary embodiment, when the predefined resource allocation scheme is the second scheme, the DCI includes information indicating a frequency-domain start position and a frequency-domain size of the PUSCH transmission, and information indicating a number of time-domain units corresponding to the PUSCH transmission. The time-domain unit is predefined, configured via high layer signaling or determined based on a predetermined correspondence with a number of sub-carriers.

In an exemplary embodiment, the DCI includes information indicating a time-domain offset of the PUSCH transmission.

In an exemplary embodiment, when the predefined resource allocation scheme is the second scheme, the DCI includes information indicating a time-domain offset of the PUSCH transmission, information indicating the frequency-domain start position and the frequency-domain size, and information indicating the time-domain length of the PUSCH transmission.

In an exemplary embodiment, when the predefined resource allocation scheme is the second scheme, the DCI includes information indicating a time-domain offset of the PUSCH transmission, information indicating the frequency-domain start position and the frequency-domain size, and information indicating a number of time-domain units corresponding to the PUSCH transmission.

In an exemplary embodiment, the information indicating the frequency-domain start position and the frequency-domain size of the PUSCH transmission is represented by X bits in the DCI.

In an exemplary embodiment, the information indicating the frequency-domain start position and the frequency-domain size of the PUSCH transmission is represented by X bits in the DCI, and the information indicating the time-domain length of the PUSCH transmission is represented by Y bits in the DCI. Alternatively, the information indicating the frequency-domain start position and the frequency-domain size of the PUSCH transmission and the information indicating the time-domain length of the PUSCH transmission is represented by P bits in the DCI.

In an exemplary embodiment, the information indicating the frequency-domain start position and the frequency-domain size of the PUSCH transmission is represented by X bits in the DCI, and the information indicating the number of time-domain units corresponding to the PUSCH transmission is represented by Z bits in the DCI. Alternatively, the information indicating the frequency-domain start position and the frequency-domain size of the PUSCH transmission and the information indicating the number of time-domain units corresponding to the PUSCH transmission is represented by Q bits in the DCI.

In an exemplary embodiment, the information indicating the time-domain offset of the PUSCH transmission and the information indicating the frequency-domain start position and the frequency-domain size is represented by S bits in the DCI, where S in a positive integer, and the information indicating the time-domain length of the PUSCH transmission is represented by Y bits in the DCI, where Y is a positive integer.

In an exemplary embodiment, the information indicating the time-domain offset of the PUSCH transmission and the information indicating the frequency-domain start position and the frequency-domain size is represented by S bits in the DCI, where S in a positive integer, and the information indicating the number of time-domain units corresponding to the PUSCH transmission is represented by Z bits in the DCI.

In an exemplary embodiment, a value of the X bits is determined based on at least one of: a predetermined correspondence between a combination of the frequency-domain start position and the frequency-domain size of the PUSCH transmission and the value of the X bits, and a value of $X_1$ bits among the X bits for indicating the frequency-domain start position of the PUSCH transmission and a value of $X_2$ bits among the X bits for indicating the frequency-domain size of the PUSCH transmission, where $X_1$ and $X_2$ are both positive integers.

In an exemplary embodiment, a value of the Y bits is determined based on at least one of: a minimum number of schedulable sub-carriers, a size of a largest schedulable transport block, and a maximum number of schedulable resource elements.

In an exemplary embodiment, a value of the P bits is dependent on a value of the X bits and a value of the Y bits.

In an exemplary embodiment, a value of the Z bits is determined based on at least one of: a minimum time-domain unit, a minimum number of schedulable sub-carriers, a size of a largest schedulable transport block, and a maximum number of schedulable resource elements.

In an exemplary embodiment, a value of the Q bits is dependent on a value of the X bits and a value of the Z bits.

In an exemplary embodiment, the maximum number of schedulable resource elements is N*M, where M is a number of resource elements for data transmission in one Physical Resource Block (PRB), and N has a predetermined value of 5, 6, 10 or 12.

In an exemplary embodiment, the information indicating the time-domain offset of the PUSCH transmission is represented by B bits in the DCI, where B is a positive integer. The time-domain offset is a number, L, of time-domain units, where L is non-negative. The time-domain unit is predefined, configured via high layer signaling or determined based on a predetermined correspondence with a number of sub-carriers.

In an exemplary embodiment, the predefined resource allocation scheme includes a predetermined subframe index of a start subframe of a PUSCH transmission being a multiple of time-domain units. The time-domain unit is predefined, configured via high layer signaling or determined based on a predetermined correspondence with a number of sub-carriers.

Further, a computer readable storage medium is provided according to an embodiment of the present disclosure. The computer readable storage medium stores computer executable instructions which, when executed by a processor, perform the above method for resource allocation.

A method for resource allocation is provided according to an embodiment of the present disclosure. The method includes: allocating, by a base station, resources for PUSCH for a UE in accordance with a predefined resource allocation scheme; and transmitting, by the base station, a resource allocation result to the UE via DCI. When a time-domain length of a PUSCH transmission is a predetermined fixed time length, the DCI includes information indicating a frequency-domain start position and a frequency-domain size of the PUSCH transmission. When the time-domain length of the PUSCH transmission is determined according to a predetermined rule, the DCI includes information indicating a frequency-domain start position and a frequency-domain size of the PUSCH transmission, and information indicating the time-domain length of the PUSCH transmission. With the solutions according to the embodiments of the present disclosure, it is possible to allocation resources for PUSCH, thereby solving the problem in the related art associated with lack of allocation scheme.

The other features and advantages of the present disclosure will be explained in the description below and will become apparent at least partially from the description or from implementation of the present disclosure. The objects and other advantages of the present disclosure can be achieved and obtained in accordance with the structures specified in the description, claims and figures.

BRIEF DESCRIPTION OF THE DRAWINGS

The present disclosure can be further understood with reference to the figures described below, which constitute a part of the present disclosure. The figures and the illustrative embodiments of the present disclosure are provided for explaining, rather than limiting, the present disclosure. In the figures.

DETAILED DESCRIPTION OF THE EMBODIMENTS

In the following, the embodiments of the present disclosure will be described in detail with reference to the figures. It is to be noted that the embodiments, and the features thereof, can be combined with each other, provided that they do not conflict.

The steps shown in the flowchart can be performed as a set of computer executable instructions in a computer system. While a logic sequence is shown in the flowchart, in some circumstances the steps as shown or described can be performed in a sequence other than the one shown in the flowchart.

Figure 1:
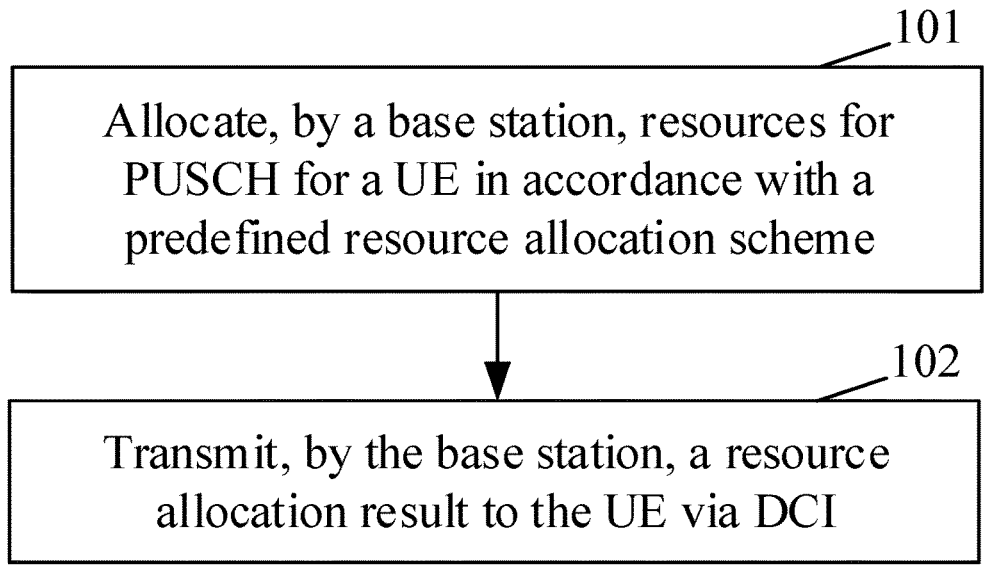
FIG. 1 is a flowchart illustrating a method for resource allocation according to an embodiment of the present disclosure.

According to an embodiment of the present disclosure, a method for resource allocation is provided. The method is applied at a base station. As shown in FIG. 1, the method includes the following steps.

At step 101, the base station allocates resources for Physical Uplink Shared Channel (PUSCH) for a User Equipment (UE) in accordance with a predefined resource allocation scheme.

At step 102, the base station transmits a resource allocation result to the UE via Downlink Control Information (DCI).

In an embodiment of the present disclosure, the UE can be a conventional UE or an MTC UE, including various devices such as a mobile terminal, a personal computer, a tablet computer or the like.

In an exemplary embodiment, the predefined resource allocation scheme includes: a first scheme in which a time-domain length of a PUSCH transmission is a predetermined fixed time length, or a second scheme in which the time-domain length of the PUSCH transmission is not the predetermined fixed time length.

In an exemplary embodiment, when the predefined resource allocation scheme is the first scheme, the predetermined fixed time length is N*V ms, where N is a positive integer having a value agreed by the base station and the UE in advance, and V has a value of 8, 10 or 12.

In an exemplary embodiment, when the predefined resource allocation scheme is the first scheme, the DCI includes information indicating a frequency-domain start position and a frequency-domain size of the PUSCH transmission.

In an exemplary embodiment, when the predefined resource allocation scheme is the second scheme, the DCI includes information indicating a frequency-domain start position and a frequency-domain size of the PUSCH transmission, and information indicating the time-domain length of the PUSCH transmission.

In an exemplary embodiment, when the predefined resource allocation scheme is the second scheme, the DCI includes information indicating a frequency-domain start position and a frequency-domain size of the PUSCH transmission, and information indicating a number of time-domain units corresponding to the PUSCH transmission. The time-domain unit is predefined, configured via high layer signaling or determined based on a predetermined correspondence with a number of sub-carriers.

In an exemplary embodiment, the DCI includes information indicating a time-domain offset of the PUSCH transmission.

In an exemplary embodiment, when the predefined resource allocation scheme is the second scheme, the DCI includes information indicating a time-domain offset of the PUSCH transmission, information indicating the frequency-domain start position and the frequency-domain size, and information indicating the time-domain length of the PUSCH transmission.

In an exemplary embodiment, when the predefined resource allocation scheme is the second scheme, the DCI includes information indicating a time-domain offset of the PUSCH transmission, information indicating the frequency-domain start position and the frequency-domain size, and information indicating a number of time-domain units corresponding to the PUSCH transmission.

In an exemplary embodiment, the information indicating the frequency-domain start position and the frequency-domain size of the PUSCH transmission is represented by X bits in the DCI.

In an exemplary embodiment, the information indicating the frequency-domain start position and the frequency-domain size of the PUSCH transmission is represented by X bits in the DCI, and the information indicating the time-domain length of the PUSCH transmission is represented by Y bits in the DCI. Alternatively, the information indicating the frequency-domain start position and the frequency-domain size of the PUSCH transmission and the information indicating the time-domain length of the PUSCH transmission is represented by P bits in the DCI.

In an exemplary embodiment, the information indicating the frequency-domain start position and the frequency-domain size of the PUSCH transmission is represented by X bits in the DCI, and the information indicating the number of time-domain units corresponding to the PUSCH transmission is represented by Z bits in the DCI. Alternatively, the information indicating the frequency-domain start position and the frequency-domain size of the PUSCH transmission and the information indicating the number of time-domain units corresponding to the PUSCH transmission is represented by Q bits in the DCI.

In an exemplary embodiment, the information indicating the time-domain offset of the PUSCH transmission and the information indicating the frequency-domain start position and the frequency-domain size is represented by S bits in the DCI, where S in a positive integer, and the information indicating the time-domain length of the PUSCH transmission is represented by Y bits in the DCI, where Y is a positive integer.

In an exemplary embodiment, the information indicating the time-domain offset of the PUSCH transmission and the information indicating the frequency-domain start position and the frequency-domain size is represented by S bits in the DCI, where S in a positive integer, and the information indicating the number of time-domain units corresponding to the PUSCH transmission is represented by Z bits in the DCI.

In an exemplary embodiment, a value of the X bits is determined based on at least one of: a predetermined correspondence between a combination of the frequency-domain start position and the frequency-domain size of the PUSCH transmission and the value of the X bits, and a value of $X_1$ bits among the X bits for indicating the frequency-domain start position of the PUSCH transmission and a value of $X_2$ bits among the X bits for indicating the frequency-domain size of the PUSCH transmission, where $X_1$ and $X_2$ are both positive integers.

In an exemplary embodiment, a value of the Y bits is determined based on at least one of: a minimum number of schedulable sub-carriers, a size of a largest schedulable transport block, and a maximum number of schedulable resource elements.

In an exemplary embodiment, a value of the P bits is dependent on a value of the X bits and a value of the Y bits.

In an exemplary embodiment, a value of the Z bits is determined based on at least one of: a minimum time-domain unit, a minimum number of schedulable sub-carriers, a size of a largest schedulable transport block, and a maximum number of schedulable resource elements.

In an exemplary embodiment, a value of the Q bits is dependent on a value of the X bits and a value of the Z bits.

In an exemplary embodiment, the maximum number of schedulable resource elements is N*M, where M is a number of resource elements for data transmission in one Physical Resource Block (PRB), and N has a predetermined value of 5, 6, 10 or 12.

In an exemplary embodiment, the information indicating the time-domain offset of the PUSCH transmission is represented by B bits in the DCI, where B is a positive integer. The time-domain offset is a number, L, of time-domain units, where L is non-negative. The time-domain unit is predefined, configured via high layer signaling or determined based on a predetermined correspondence with a number of sub-carriers.

In an exemplary embodiment, the predefined resource allocation scheme includes a predetermined subframe index of a start subframe of a PUSCH transmission being a multiple of time-domain units. The time-domain unit is predefined, configured via high layer signaling or determined based on a predetermined correspondence with a number of sub-carriers.

In this exemplary embodiment, it is to be noted here that the above first scheme, second scheme and the resource allocation scheme in this embodiment are independent from each other. It is also to be noted that, when there is a conflict between a resource allocation result according to the resource allocation scheme in this embodiment and a resource allocation result of the above first or second scheme, the resource allocation result obtained according to the resource allocation scheme in this embodiment has a priority to be adopted.

Here, the time-domain unit can be predefined as 1 ms. That is, the time-domain unit can have a length of one subframe.

A method for resource allocation is provided according to the embodiment of the present disclosure. A base station allocates resources for PUSCH for a UE in accordance with a predefined resource allocation scheme, and transmits a resource allocation result to the UE via DCI. When a time-domain length of a PUSCH transmission is a predetermined fixed time length, the DCI includes information indicating a frequency-domain start position and a frequency-domain size of the PUSCH transmission. When the time-domain length of the PUSCH transmission is determined according to a predetermined rule, the DCI includes information indicating a frequency-domain start position and a frequency-domain size of the PUSCH transmission, and information indicating the time-domain length of the PUSCH transmission. With the solutions according to the embodiments of the present disclosure, it is possible to allocation resources for PUSCH, thereby solving the problem in the related art associated with lack of allocation scheme.

In the following, the solutions of the present disclosure will be described in detail with reference to various embodiments.

Embodiment 1

In this embodiment, it is assumed that the base station allocates resources for PUSCH for the UE according to the first scheme and then transmits the resource allocation result to the UE. It is further assumed that the predetermined fixed time length in the first scheme is 12 ms (when N=1). These assumptions are made for the purpose of illustration of the solution according to this embodiment, rather than limiting the present disclosure. With the above assumptions, three implementation examples will be given for explaining Embodiment 1. These implementation examples are not isolated, but can refer to each other for understanding the present disclosure.

Implementation Example 1

Since the time-domain length of the PUSCH transmission is fixed at 12 ms, the base station allocates resources for the PUSCH transmission for the UE by transmitting the resource allocation result via the DCI. Here, the DCI includes information indicating a frequency-domain start position and a frequency-domain size of the PUSCH transmission (in the embodiment of the present disclosure, the information for indication can be a number of bits in the DCI; the same also applies to the information for indication as described hereinafter). The information indicating the frequency-domain start position and the frequency-domain size of the PUSCH transmission can be represented by X bits. A correspondence between combinations of frequency-domain start positions and frequency-domain sizes of PUSCH transmissions and values of the X bits associated with the information can be agreed by the base station and the UE in advance. An example of such pre-agreed correspondence is shown in Table 1 below, where X=5 and the number of sub-carriers supported by the PUSCH transmission can be {1, 2, 4, 6, 8, 12}. In Table 1, when the base station needs to schedule a PUSCH having one sub-carrier and a frequency-domain start position of 1, the X=5 bits transmitted by the base station via DCI have a value of 00000. In this case, the PUSCH transmission has one sub-carrier, the frequency-domain start position of 1 and the time-domain length of 12 ms. In this implementation example, it can be seen from Table 1 that, when the number of sub-carriers is 2, 4, 6 or 8, the number of frequency-domain start positions is limited to 6, 3, 2 or 1, respectively. Here, assuming X=5, 5 bits can have 32 combinations. However, there are 6*12=72 types of combinations of frequency-domain start positions and frequency-domain sizes in this implementation example and thus a one-to-one correspondence is impossible.

TABLE 1

| Value of X bits | {Frequency-Domain Size, Frequency-Domain Start Position} |
|---|---|
| 00000 | {No. of Sub-carriers: 1, Start Position: 1} |
| 00001 | {No. of Sub-carriers: 1, Start Position: 2} |
| 00010 | {No. of Sub-carriers: 1, Start Position: 3} |
| 00011 | {No. of Sub-carriers: 1, Start Position: 4} |
| 00100 | {No. of Sub-carriers: 1, Start Position: 5} |
| 00101 | {No. of Sub-carriers: 1, Start Position: 6} |
| 00110 | {No. of Sub-carriers: 1, Start Position: 7} |
| 00111 | {No. of Sub-carriers: 1, Start Position: 8} |
| 01000 | {No. of Sub-carriers: 1, Start Position: 9} |
| 01001 | {No. of Sub-carriers: 1, Start Position: 10} |
| 01010 | {No. of Sub-carriers: 1, Start Position: 11} |
| 01011 | {No. of Sub-carriers: 1, Start Position: 12} |
| 01100 | {No. of Sub-carriers: 2, Start Position: 1} |
| 01101 | {No. of Sub-carriers: 2, Start Position: 2} |
| 01110 | {No. of Sub-carriers: 2, Start Position: 3} |
| 01111 | {No. of Sub-carriers: 2, Start Position: 4} |
| 10000 | {No. of Sub-carriers: 2, Start Position: 5} |
| 10001 | {No. of Sub-carriers: 2, Start Position: 6} |
| 10010 | {No. of Sub-carriers: 4, Start Position: 1} |
| 10011 | {No. of Sub-carriers: 4, Start Position: 2} |
| 10100 | {No. of Sub-carriers: 4, Start Position: 3} |
| 10101 | {No. of Sub-carriers: 6, Start Position: 1} |
| 10110 | {No. of Sub-carriers: 6, Start Position: 2} |
| 10111 | {No. of Sub-carriers: 8, Start Position: 1} |
| 11000 | {No. of Sub-carriers: 12} |

It is to be noted that there is a one-to-one correspondence between the two parameters in the left and right columns in each line of Table 1. Such correspondence between the two parameters in the left and right columns in each line of Table 1 is illustrative only. Other correspondences are possible and can be applied by those skilled in the art as appropriate.

Implementation Example 2

Since the time-domain length of the PUSCH transmission is fixed at 12 ms, the base station allocates resources for the PUSCH transmission for the UE by transmitting the resource allocation result to the UE via the DCI. Here, the DCI includes information indicating a frequency-domain start position and a frequency-domain size of the PUSCH transmission. The information corresponds to X bits. The value of the X bits can be dependent on a value of $X_1$ bits among the X bits for indicating the frequency-domain start position of the PUSCH transmission and a value of $X_2$ bits among the X bits for indicating the frequency-domain size of the PUSCH transmission. Assuming the total number of sub-carriers supported in the uplink to be 12, there can be 12 frequency-domain start positions and thus $X_1$=4. Assuming that there are A different numbers of sub-carriers supported by PUSCH transmissions, $X_2$=ceil(log 2(A)), where ceil denotes a ceiling operation. An example of such pre-agreed correspondence is shown in Table 2 below, where $X_2$=3 (A=6 in this example as can be seen in Table 2) and X=7. When the base station needs to schedule a PUSCH having one sub-carrier and a frequency-domain start position of 1, in a possible case, the X=7 bits transmitted by the base station via DCI have a value of 0000000. In this case, the PUSCH transmission has one sub-carrier, the frequency-domain start position of 1 and the time-domain length of 12 ms. It can be seen from Table 2 that, among the 7 bits, the $X_2$=3 bits on the right being 000 represent the number of sub-carriers to be 1 and the $X_1$=4 on the left being 0000 represent the frequency-domain start position of 1 (which is a possible example only).

TABLE 2

| Value of $X_2$ bits | No. of Sub-Carriers |
|---|---|
| 000 | 1 |
| 001 | 2 |
| 010 | 4 |
| 011 | 6 |
| 100 | 8 |
| 101 | 12 |

It is to be noted that there is a correspondence between the two parameters in the left and right columns in each line of Table 2. Such correspondence given in Table 2 is illustrative only. Other correspondences are possible and can be applied by those skilled in the art as appropriate.

Implementation Example 3

Since the time-domain length of the PUSCH transmission is fixed at 12 ms, the base station allocates resources for the PUSCH transmission for the UE by transmitting the resource allocation result via the DCI. Here, the DCI includes information indicating a frequency-domain start position and a frequency-domain size of the PUSCH transmission. The information corresponds to X bits. Assuming the total number of sub-carriers supported in the uplink to be 12, there can be 12 frequency-domain start positions and thus $X_1$=4. Assuming that there are A=6 different numbers of sub-carriers supported by PUSCH transmissions (i.e., the numbers of sub-carriers can be 1, 2, 4, 6, 8 or 12), $X_2$ can be calculated according to the equation given in Implementation Example 2, i.e., $X_2$=3. However, in order to reduce the overhead of the downlink control signaling, in this implementation example, the value of $X_2$ can be reduced to indicate a portion of the numbers of sub-carriers. For example, in a hypothetic pre-agreed correspondence shown in Table 3, $X_2$=2 and then X=6. The other number of sub-carriers can be represented by a pre-agreed correspondence for the remaining states. For example, when the base station needs to schedule a PUSCH having 12 sub-carriers based on a scheduling condition, the value of X=6 bits can be 111111. In this case, the PUSCH transmission has 12 sub-carriers, the frequency-domain start position of 1 and the time-domain length of 12 ms. Here, 111111 shall not belong to the correspondence contained in Table 3. That is, the two bits on the right having a value of 11 do not correspond to 6 sub-carriers in Table 3. 111111 can be interpreted as one of the remaining pre-agreed states as mentioned above. In this implementation example, it is specified to correspond to the situation where the number of sub-carriers is 12 and the frequency-domain start position is 1.

TABLE 3

| Value of $X_2$ bits | No. of Sub-Carriers |
|---|---|
| 00 | 1 |
| 01 | 2 |
| 10 | 4 |
| 11 | 6 |

It is to be noted that there is a correspondence between the two parameters in the left and right columns in each line of Table 3. Such correspondence given in Table 3 is illustrative only. Other correspondences are possible and can be applied by those skilled in the art as appropriate.

Embodiment 2

In this embodiment, it is assumed that the number of bits for the information indicating the time-domain length of the PUSCH transmission depends on a maximum number of schedulable Resource Elements (REs) and a minimum number of sub-carriers. It is further assumed that the maximum number of schedulable REs is N*M, where N=5 and M=144, and the minimum number of sub-carriers is 1. Then, the maximum value of the time-domain length is 60 ms (=(5*144)/(1*12), where 12 is the number of REs contained in 1 ms) and Y=6 (since $2^6$=64, 6 bits are sufficient to indicate 60 ms). With the above assumptions, several implementation examples will be given for explaining Embodiment 2.

Implementation Example 1

It is further assumed that, in this embodiment, the base station allocates resources for PUSCH for the UE according to the second scheme and then transmits a resource allocation result to the UE via DCI. Here, in the DCI, the information indicating the frequency-domain start position and the frequency-domain size of the PUSCH transmission is represented by X bits, and the information indicating the time-domain length of the PUSCH transmission is represented by Y bits. Assuming that the base station needs to schedule a PUSCH having one sub-carrier, a frequency-domain start position of 1 and a time-domain length of 24 ms, the 5 bits for the information indicating the frequency-domain start position and the frequency-domain size of the PUSCH transmission as transmitted by the base station via the DCI have a value of 00000 (referring to Table 4 below, in which a correspondence between frequency-domain start positions and frequency-domain sizes and X bits is shown, assuming that the numbers of sub-carriers supported include 1, 3, 6 and 12). The information indicating the time-domain length of the PUSCH transmission as transmitted by the base station via the DCI can be 010111. In this embodiment, the number of bits for the information indicating the time-domain length of the PUSCH transmission can be Y=6. In one possible case, 000000 corresponds to a time-domain length of 1 ms, 000001 corresponds to a time-domain length of 2 ms, . . . , 111011 corresponds to a time-domain length of 60 ms. As the value of the time-domain length increases, the value of the 6 bits increases accordingly.

TABLE 4

| Value of X bits | {Frequency-Domain Size, Frequency-Domain Start Position} |
| --- | --- |
| 00000 | {No. of Sub-Carriers1, Start Position1} |
| 00001 | {No. of Sub-Carriers1, Start Position2} |
| 00010 | {No. of Sub-Carriers1, Start Position3} |
| 00011 | {No. of Sub-Carriers1, Start Position4} |
| 00100 | {No. of Sub-Carriers1, Start Position5} |
| 00101 | {No. of Sub-Carriers1, Start Position6} |
| 00110 | {No. of Sub-Carriers1, Start Position7} |
| 00111 | {No. of Sub-Carriers1, Start Position8} |
| 01000 | {No. of Sub-Carriers1, Start Position9} |
| 01001 | {No. of Sub-Carriers1, Start Position10} |
| 01010 | {No. of Sub-Carriers1, Start Position11} |
| 01011 | {No. of Sub-Carriers1, Start Position12} |
| 01100 | {No. of Sub-Carriers3, Start Position1} |
| 01101 | {No. of Sub-Carriers3, Start Position2} |
| 01110 | {No. of Sub-Carriers3, Start Position3} |
| 01111 | {No. of Sub-Carriers3, Start Position4} |
| 10000 | {No. of Sub-Carriers6, Start Position1} |
| 10001 | {No. of Sub-Carriers6, Start Position2} |
| 10010 | {No. of Sub-Carriers12} |

Implementation Example 2

It is further assumed that, in this embodiment, the base station allocates resources for PUSCH for the UE according to the second scheme and then transmits a resource allocation result to the UE via DCI. Here, the information indicating the frequency-domain start position and the frequency-domain size of the PUSCH transmission and the information indicating the time-domain length of the PUSCH transmission is represented by P bits in the DCI. The P bits can be obtained by encoding the X bits for the information indicating the frequency-domain start position and the frequency-domain size of the PUSCH transmission and the Y bits for the information indicating the time-domain length of the PUSCH transmission jointly. Assuming that the base station needs to schedule a PUSCH having one sub-carrier, a frequency-domain start position of 1 and a time-domain length of 24 ms, the 5 bits for the information indicating the frequency-domain start position and the frequency-domain size of the PUSCH transmission as transmitted by the base station via the DCI have a value of 00000 (referring to Table 4). The information indicating the time-domain length of the PUSCH transmission as transmitted by the base station via the DCI can be 010111 (referring to Implementation 1 of Embodiment 2). The base station can encode 00000, representing the information indicating the frequency-domain start position and the frequency-domain size of the PUSCH transmission, and 010111, representing the information indicating the time-domain length of the PUSCH transmission, to obtain 00000010111 and transmit it in the form of DCI. In this embodiment, an example of such joint encoding is provided. That is, the number, P, of bits obtained by the joint encoding is a sum of the numbers of bits for representing the two items of information to be encoded, respectively, i.e., P=X+Y. The present disclosure is not limited to this joint encoding scheme. Any joint encoding scheme, as long as it uses P bits for representing the information indicating the frequency-domain start position and the frequency-domain size of the PUSCH transmission and the information indicating the time-domain length of the PUSCH transmission jointly, where P≤X+Y, is to be encompassed by the scope of the present disclosure.

It is to be noted here that the above assumptions and examples for provided for illustration of the solutions according to the present disclosure. Only some possibilities have been described here and the present disclosure is not limited to these possibilities.

Embodiment 3

In this embodiment, it is assumed that the number, Z, bits for the information indicating the number of time-domain units corresponding to the PUSCH transmission depends on a maximum number of schedulable resource elements, a minimum number of sub-carriers and a time-domain unit. It is further assumed that the maximum number of resource elements is 5*144 and the time-domain unit is predetermined as 12 ms. Then, the maximum number of time-domain units is 5 (as calculated with reference to Embodiment 2), and the number, Z, bits for the information indicating the number of time-domain units is 3 (since $2^3=8$, 3 bits are sufficient to indicate 5 values).

It is further assumed that, in this embodiment, the base station allocates resources for PUSCH for the UE according to the second scheme and then transmits a resource allocation result to the UE via DCI. Here, the DCI includes the information indicating the frequency-domain start position and the frequency-domain size of the PUSCH transmission, and information indicating the number of time-domain units corresponding to the PUSCH transmission. Assuming that the base station needs to schedule a PUSCH having one sub-carrier, a frequency-domain start position of 1 and a time-domain length of 24 ms, the X=5 bits for the information indicating the frequency-domain start position and the frequency-domain size of the PUSCH transmission as transmitted by the base station via the DCI have a value of 00000 (referring to Implementation Example 1 of Embodiment 1). Since the time-domain unit is fixed at 12 ms, when the time-domain length is 24 ms, the number of time-domain units is 2. Accordingly, the Z=3 bits for the information indicating the number of time-domain units corresponding to the PUSCH transmission as transmitted by the base station via the DCI have a value of 001. In this embodiment, the information indicating the number of time-domain units is indicated by a 3-bit value. In one possible case, 000 corresponds to 1 time-domain unit, 001 corresponds to 2 time-domain units, . . . , 011 corresponds to 4 time-domain units and 100 corresponds to 5 time-domain units. As the value of the time-domain length increases, the value of the 3 bits increases accordingly.

It is to be noted here that the above assumptions and examples for provided for illustration of the solutions according to the present disclosure. Only some possibilities have been described here and the present disclosure is not limited to these possibilities.

Embodiment 4

In this embodiment, it is assumed that the number, Z, bits for the information indicating the time-domain length of the PUSCH transmission depends on a maximum number of schedulable resource elements, a minimum number of sub-carriers and a time-domain unit. It is further assumed that the maximum number of resource elements is 5*144 and the time-domain unit is predetermined as 12 ms. Then, the maximum number of time-domain units is 5, and the number, Z, bits for the information indicating the number of time-domain units is 3 (referring to Embodiment 3). With the above assumptions, two implementation examples will be given below for explaining Embodiment 4.

Implementation Example 1

It is further assumed that, in this implementation example, the base station allocates resources for PUSCH for the UE according to the second scheme and then transmits a resource allocation result to the UE via DCI. Here, the DCI includes the information indicating the frequency-domain start position and the frequency-domain size of the PUSCH transmission, and information indicating the number of time-domain units corresponding to the PUSCH transmission. Assuming that the base station needs to schedule a PUSCH having 2 sub-carriers, a frequency-domain start position of 1 and a time-domain length of 24 ms, the X=5 bits for the information indicating the frequency-domain start position and the frequency-domain size of the PUSCH transmission as transmitted by the base station via the DCI have a value of 01100 (referring to Implementation Example 1 of Embodiment 1). The number of sub-carriers is 2, and assuming a predetermined correspondence between number of sub-carriers and time-domain units as shown in Table 5, the time-domain unit is 6 ms. The time-domain length is 24 ms, which are 4 time-domain units. Accordingly, the Z=3 bits for the information indicating the number of time-domain units corresponding to the PUSCH transmission as transmitted by the base station via the DCI have a value of 011 (referring to Embodiment 3).

TABLE 5

| No. of Sub-Carriers | Time-Domain Unit |
|---|---|
| 12 | 1 ms |
| 6 | 2 ms |
| 4 | 3 ms |
| 3 | 4 ms |
| 2 | 6 ms |
| 1 | 12 ms/8 ms |

Implementation Example 2

It is further assumed that, in this implementation example, the base station allocates resources for PUSCH for the UE according to the second scheme and then transmits a resource allocation result to the UE via DCI. Here, the DCI includes the information indicating the frequency-domain start position and the frequency-domain size of the PUSCH transmission, and information indicating the number of time-domain units corresponding to the PUSCH transmission. Assuming that the base station needs to schedule a PUSCH having 12 sub-carriers, a frequency-domain start position of 1 and a time-domain length of 60 ms, the X=5 bits for the information indicating the frequency-domain start position and the frequency-domain size of the PUSCH transmission as transmitted by the base station via the DCI have a value of 11110 (referring to Implementation Example 1 of Embodiment 1). The time-domain length is 60 ms, which are 5 time-domain units. Accordingly, the Z=3 bits for the information indicating the number of time-domain units corresponding to the PUSCH transmission as transmitted by the base station via the DCI have a value of 100 (referring to Embodiment 3).

It is to be noted here that the above assumptions and examples for provided for illustration of the solutions according to the present disclosure. Only some possibilities have been described here and the present disclosure is not limited to these possibilities.

Embodiment 5

Five implementation examples will be given below for explaining this embodiment.

Implementation Example 1

In this implementation example, it is assumed that the base station transmits the DCI associated with PUSCH for the UE in subframes {n, n+1}. It is further assumed that the DCI includes 2 bits for information indicating a time-domain offset of the PUSCH transmission. A correspondence between values of the 2 bits and values of the time-domain offset is shown in Table 6, where K is the length of the time-domain unit. The DCI indicates that the number of sub-carriers for the PUSCH transmission is 6, i.e., K=2 ms (referring to Table 5 in Implementation Example 1 of Embodiment 4). It is further assumed that, based on a scheduling condition, the base station requires the UE to start transmitting PUSCH at the subframe n+5 (assuming here that this implementation example is based on a current scheduling timing of 4 subframes). Since the UE starts transmitting the PUSCH at the subframe n+5 based on the scheduling timing, the 2 bits representing the time-domain offset in the DCI are 00.

TABLE 6

| Value of B bits | Time-Domain Offset |
|---|---|
| 00 | 0 |
| 01 | K |
| 10 | 2K |
| 11 | 3K |

Implementation Example 2

In this implementation example, it is assumed that the base station transmits the DCI associated with PUSCH for the UE in subframes {n, n+1}. It is further assumed that the DCI includes 2 bits for information indicating a time-domain offset of the PUSCH transmission. A correspondence between values of the 2 bits and values of the time-domain offset is shown in Table 6, where K is the number of time-domain units. The DCI indicates that the number of sub-carriers for the PUSCH transmission is 6, i.e., K=2. It is further assumed that, based on a scheduling condition, the base station requires the UE to start transmitting PUSCH at the subframe n+7. Since the UE starts transmitting the PUSCH at the subframe n+5 based on the scheduling timing (assuming here that this implementation example is based on a current scheduling timing of 4 subframes), the 2 bits representing the time-domain offset in the DCI are 01.

Implementation Example 3

In this implementation example, it is assumed that the base station transmits the DCI associated with PUSCH for the UE in a subframe {n}. It is further assumed that the DCI includes 6 bits for information indicating a time-domain offset of the PUSCH transmission. A correspondence between values of the 6 bits and values of the time-domain offset is shown in Table 7. It is further assumed that, based on a scheduling condition, the base station requires the UE to start transmitting PUSCH at the subframe n+7, the B bits indicating the time-domain offset in the DCI configured by the base station have a value of 000110 (referring to Table 7, representing a time-domain offset value of 7). Upon receiving the DCI, the UE determines the value of the time-domain offset and transmits the PUSCH at the subframe n+7 (this implementation example is not based on the current scheduling timing and the UE can determine the start subframe for transmission of the PUSCH based on the value of the time-domain offset indicated by the base station). Here, the value of the time-domain offset is dependent on at least one of: a sub-carrier spacing, a number of multiplexed UEs, a number of sub-carriers, a length of a scheduling window, and a period of the scheduling window. Further, the maximum value of the time-domain offset is a power of 2.

TABLE 7

| Value of B bits | Time-Domain Offset |
|---|---|
| 000000~111111 | 1~64 |

Implementation Example 4

In this embodiment, it is assumed that the base station schedules uplink data in scheduling windows or scheduling periods. The length of the scheduling window is assumed to be 32 ms. Assuming that the base station transmits the DCI associated with PUSCH for the UE at a subframe {n} of a radio frame #1 in a scheduling window #0, the UE transmits the PUSCH in a scheduling window #1. Here, the start subframe of the PUSCH in the scheduling window #1 is determined based on the time-domain offset in the DCI. The value of the time-domain offset is dependent on the length of the scheduling window. For example, when the length of the scheduling window is $32=2^5$, the time-domain offset can be indicated by 5 bits in the DCI. For example, the time-domain offset of 1~32 ms can be indicated by 00000~11111. Upon receiving the DCI transmitted from the base station, the UE obtains the value of the first 5 bits to determine the time-domain offset, and then determines a subframe within the scheduling window #1 as a start subframe for transmission of the PUSCH. It is to be noted here that the implementation example is based on the scheduling timing, which is only used to determine the scheduling window in which the PUSCH transmission is located. The UE can determine the start subframe within the scheduling window for transmission of the PUSCH based on the value of the time-domain offset indicated by the base station.

Implementation Example 5

It is assumed that the base station schedules uplink data in scheduling windows or scheduling periods. The length of the scheduling window is assumed to be 32 ms. It is further assumed that the base station transmits the DCI associated with PUSCH for the UE at a subframe {n} of a radio frame #1 in a scheduling window #0. It is further assumed that the information indicating the time-domain offset of the PUSCH transmission and the information indicating the frequency-domain start position and the frequency-domain size is indicated jointly by S bits in the DCI, as shown in Table 8. Assuming that the S bits configured by the base station have a value of 00101111, the UE transmits a PUSCH having one sub-carrier at a frequency-domain start position of 12 and a time-domain start position of 4 within a scheduling window 1. When there is one sub-carrier, it is assumed that the frequency-domain start positions 1~12 are sub-carriers having predetermined sub-carrier indices 0~11, respectively, and the time-domain start positions 1~4 are subframes having predetermined subframe indices 0, 8, 16 and 24, respectively. When the number of sub-carriers is 3, it is assumed that the frequency-domain start positions 1~4 are sub-carriers having predetermined sub-carrier indices 0, 4, 8 and 12, respectively, and the time-domain start positions 1~8 are subframes having predetermined subframe indices 0, 4, 8, 12, 16, 20, 24 and 28, respectively. When the number of sub-carriers is 6, it is assumed that the frequency-domain start positions 1~2 are sub-carriers having predetermined sub-carrier indices 0 and 6, respectively, and the time-domain start positions 1~16 are subframes having predetermined subframe indices 0, 2, 4, 6, 8, 10, 12, 14, 16, 18, 20, 22, 24, 26 and 28, respectively. When the number of sub-carriers is 12, it is assumed that the frequency-domain start position 1 is the sub-carrier having a predetermined sub-carrier index 0, and the time-domain start positions 1~32 are subframes having predetermined subframe indices 0~31, respectively. Here, the predetermined subframe indices are indices increasing sequentially from a predetermined subframe. In this embodiment, the predetermined subframe is the start subframe of the scheduling window 1. The predetermined sub-carrier indices are indices increasing or decreasing sequentially from a predetermined sub-carrier. The predetermined sub-carrier can be a carrier having the highest or lowest carrier frequency in the system.

TABLE 8

| Value of the S bits | {No. of Sub-Carriers, Frequency-Domain Start Position, Time-Domain Start Position} |
|---|---|
| 00000000~00101111 | No. of Sub-Carriers: 1, Frequency-Domain Start Position: 1~12, Time-Domain Start Position: 1~4, |
| 00110000~01001111 | No. of Sub-Carriers: 3, Frequency-Domain Start Position: 1~4, Time-Domain Start Position: 1~8 |
| 01010000~01101111 | No. of Sub-Carriers: 6, Frequency-Domain Start Position: 1~2, Time-Domain Start Position: 1~16 |
| 01110000~10001111 | No. of Sub-Carriers: 12, Frequency-Domain Start Position: 1, Time-Domain Start Position: 1~32 |

Embodiment 6

Two implementation examples will be given below for explaining this embodiment.

Implementation Example 1

In this implementation example, it is assumed that the base station transmits the DCI associated with PUSCH for the UE in a subframe {1}. It is further assumed that the DCI includes 6 bits for information indicating a time-domain offset of the PUSCH transmission. A correspondence between values of the 6 bits and values of the time-domain offset is shown in Table 7. It is further assumed that the number of sub-carriers for the PUSCH transmission is 3. It is further assumed that, based on a scheduling condition, the base station requires the UE to start transmitting PUSCH at the subframe 7. The base station also considers that a predetermined subframe index of a start subframe of the PUSCH transmission is a multiple of time-domain unit. When the number of sub-carriers is 3, the time-domain unit is 4 ms (referring to Table 5 in Implementation Example 1 of Embodiment 4). In this case, the B bits indicating the time-domain offset in the DCI configured by the base station have a value of 000110 (referring to Table 7, representing a time-domain offset value of 7). Upon receiving the DCI, the UE determines the value of the time-domain offset and transmits the PUSCH at the subframe 8. It is to be noted that this implementation example is not based on the scheduling timing and the UE can determine the time-domain offset based on the value of the time-domain offset indicated by the base station and in turn determine the start subframe for transmission of the PUSCH.

Implementation Example 2

In this implementation example, it is assumed that the base station transmits the DCI associated with PUSCH for the UE in a subframe {1}. It is further assumed that the DCI includes 6 bits for information indicating a time-domain offset of the PUSCH transmission. A correspondence between values of the 6 bits and values of the time-domain offset is shown in Table 7. It is further assumed that the number of sub-carriers for the PUSCH transmission is 3. It is further assumed that, based on a scheduling condition, the base station requires the UE to start transmitting PUSCH at the subframe 7. In this case, the B bits indicating the time-domain offset in the DCI configured by the base station have a value of 000101 (referring to Table 7, representing a time-domain offset value of 6). Upon receiving the DCI, the UE determines the value of the time-domain offset and is to transmit the PUSCH at the subframe 7. However, the UE also considers that a predetermined subframe index of a start subframe of the PUSCH transmission is a multiple of time-domain unit. When the number of sub-carriers is 3, the time-domain unit is 4 ms (referring to Table 5). Hence, the UE decides to transmit the PUSCH at the subframe 8 (in order to ensure that the predetermined subframe index 8 of the start subframe of the PUSCH transmission is a multiple of time-domain unit 4). It is to be noted that this implementation example is not based on the scheduling timing and the UE can determine the time-domain offset based on the value of the time-domain offset indicated by the base station and in turn determine the start subframe for transmission of the PUSCH. The predetermined sub-carrier indices are indices increasing or decreasing sequentially from a predetermined sub-carrier. In this embodiment, the predetermined sub-carrier is assumed to be the subframe 0.

It is to be noted here that the above assumptions and examples for provided for illustration of the solutions according to the present disclosure. Only some possibilities have been described here and the present disclosure is not limited to these possibilities.

It is to be note here that the above six embodiments and their implementation examples are not isolated from each other. Rather, they can be cross-referenced to explain the solutions according to the present disclosure. The solutions according to the present disclosure are not limited to these embodiments.

Figure 2:
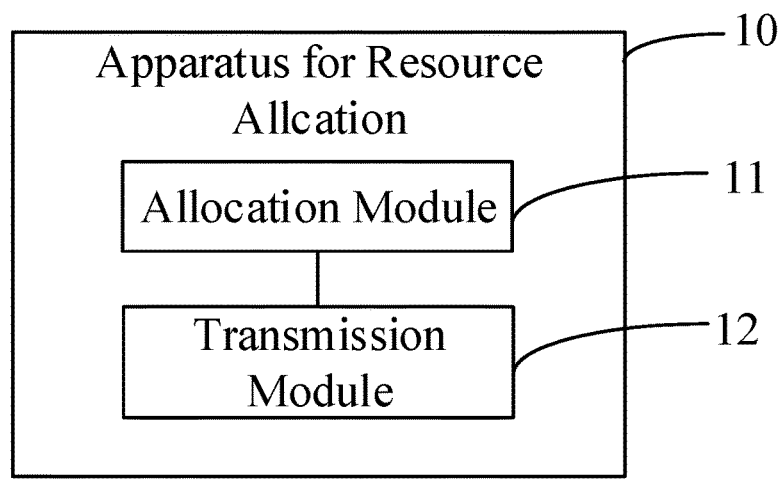
FIG. 2 is a schematic diagram showing a structure of an apparatus for resource allocation according to an embodiment of the present disclosure.

According to an embodiment of the present disclosure, an apparatus 10 for resource allocation is provided. The apparatus 10 can be provided at a base station. As shown in FIG. 2, the apparatus includes: an allocation module 11 configured to allocate resources for Physical Uplink Shared Channel (PUSCH) for a User Equipment (UE) in accordance with a predefined resource allocation scheme; and a transmission module 12 configured to transmit a resource allocation result to the UE via Downlink Control Information (DCI).

In an exemplary embodiment, the predefined resource allocation scheme includes: a first scheme in which a time-domain length of a PUSCH transmission is a predetermined fixed time length, or a second scheme in which the time-domain length of the PUSCH transmission is not the predetermined fixed time length.

In an exemplary embodiment, when the predefined resource allocation scheme is the first scheme, the predetermined fixed time length is N*V ms, where N is a positive integer having a value agreed by the base station and the UE in advance, and V has a value of 8, 10 or 12.

In an exemplary embodiment, when the predefined resource allocation scheme is the first scheme, the DCI includes information indicating a frequency-domain start position and a frequency-domain size of the PUSCH transmission.

In an exemplary embodiment, when the predefined resource allocation scheme is the second scheme, the DCI includes information indicating a frequency-domain start position and a frequency-domain size of the PUSCH transmission, and information indicating the time-domain length of the PUSCH transmission.

In an exemplary embodiment, when the predefined resource allocation scheme is the second scheme, the DCI includes information indicating a frequency-domain start position and a frequency-domain size of the PUSCH transmission, and information indicating a number of time-domain units corresponding to the PUSCH transmission. The time-domain unit is predefined, configured via high layer signaling or determined based on a predetermined correspondence with a number of sub-carriers.

In an exemplary embodiment, the DCI includes information indicating a time-domain offset of the PUSCH transmission.

In an exemplary embodiment, when the predefined resource allocation scheme is the second scheme, the DCI includes information indicating a time-domain offset of the PUSCH transmission, information indicating the frequency-domain start position and the frequency-domain size, and information indicating the time-domain length of the PUSCH transmission.

In an exemplary embodiment, when the predefined resource allocation scheme is the second scheme, the DCI includes information indicating a time-domain offset of the PUSCH transmission, information indicating the frequency-domain start position and the frequency-domain size, and information indicating a number of time-domain units corresponding to the PUSCH transmission.

In an exemplary embodiment, the information indicating the frequency-domain start position and the frequency-domain size of the PUSCH transmission is represented by X bits in the DCI.

In an exemplary embodiment, the information indicating the frequency-domain start position and the frequency-domain size of the PUSCH transmission is represented by X bits in the DCI, and the information indicating the time-domain length of the PUSCH transmission is represented by Y bits in the DCI. Alternatively, the information indicating the frequency-domain start position and the frequency-domain size of the PUSCH transmission and the information indicating the time-domain length of the PUSCH transmission is represented by P bits in the DCI.

In an exemplary embodiment, the information indicating the frequency-domain start position and the frequency-domain size of the PUSCH transmission is represented by X bits in the DCI, and the information indicating the number of time-domain units corresponding to the PUSCH transmission is represented by Z bits in the DCI. Alternatively, the information indicating the frequency-domain start position and the frequency-domain size of the PUSCH transmission and the information indicating the number of time-domain units corresponding to the PUSCH transmission is represented by Q bits in the DCI.

In an exemplary embodiment, the information indicating the time-domain offset of the PUSCH transmission and the information indicating the frequency-domain start position and the frequency-domain size is represented by S bits in the DCI, where S in a positive integer, and the information indicating the time-domain length of the PUSCH transmission is represented by Y bits in the DCI, where Y is a positive integer.

In an exemplary embodiment, the information indicating the time-domain offset of the PUSCH transmission and the information indicating the frequency-domain start position and the frequency-domain size is represented by S bits in the DCI, where S in a positive integer, and the information indicating the number of time-domain units corresponding to the PUSCH transmission is represented by Z bits in the DCI.

In an exemplary embodiment, a value of the X bits is determined based on at least one of: a predetermined correspondence between a combination of the frequency-domain start position and the frequency-domain size of the PUSCH transmission and the value of the X bits, and a value of $X_1$ bits among the X bits for indicating the frequency-domain start position of the PUSCH transmission and a value of $X_2$ bits among the X bits for indicating the frequency-domain size of the PUSCH transmission, where $X_1$ and $X_2$ are both positive integers.

In an exemplary embodiment, a value of the Y bits is determined based on at least one of: a minimum number of schedulable sub-carriers, a size of a largest schedulable transport block, and a maximum number of schedulable resource elements.

In an exemplary embodiment, a value of the P bits is dependent on a value of the X bits and a value of the Y bits.

In an exemplary embodiment, a value of the Z bits is determined based on at least one of: a minimum time-domain unit, a minimum number of schedulable sub-carriers, a size of a largest schedulable transport block, and a maximum number of schedulable resource elements.

In an exemplary embodiment, a value of the Q bits is dependent on a value of the X bits and a value of the Z bits.

In an exemplary embodiment, the maximum number of schedulable resource elements is N*M, where M is a number of resource elements for data transmission in one Physical Resource Block (PRB), and N has a predetermined value of 5, 6, 10 or 12.

In an exemplary embodiment, the information indicating the time-domain offset of the PUSCH transmission is represented by B bits in the DCI, where B is a positive integer. The time-domain offset is a number, L, of time-domain units, where L is non-negative. The time-domain unit is predefined, configured via high layer signaling or determined based on a predetermined correspondence with a number of sub-carriers.

In an exemplary embodiment, the predefined resource allocation scheme includes a predetermined subframe index of a start subframe of a PUSCH transmission being a multiple of time-domain units. The time-domain unit is predefined, configured via high layer signaling or determined based on a predetermined correspondence with a number of sub-carriers.

This embodiment is provided for implementing the above method embodiments. For the process flows and operation principles of the respective modules in this embodiment, reference can be made to the above method embodiments and the details thereof will be omitted here.

An apparatus for resource allocation is provided according to an embodiment of the present disclosure. The apparatus can be applied in a base station. The base station allocates resources for PUSCH for a UE in accordance with a predefined resource allocation scheme; and transmits a resource allocation result to the UE via DCI. When a time-domain length of a PUSCH transmission is a predetermined fixed time length, the DCI includes information indicating a frequency-domain start position and a frequency-domain size of the PUSCH transmission. When the time-domain length of the PUSCH transmission is determined according to a predetermined rule, the DCI includes information indicating a frequency-domain start position and a frequency-domain size of the PUSCH transmission, and information indicating the time-domain length of the PUSCH transmission. With the solutions according to the embodiments of the present disclosure, it is possible to allocation resources for PUSCH, thereby solving the problem in the related art associated with lack of allocation scheme.

In an embodiment of the present disclosure, a storage medium is provided. In this embodiment, the storage medium can be configured to store program codes for performing the method steps according to the above embodiments.

In this embodiment, the above-described storage medium may include, but not limited to, a USB disk, a Read-Only Memory (ROM), a Random Access Memory (RAM), a mobile hard disk, a magnetic disc or CD-ROM and other medium that can store program codes.

In this embodiment, the processor can execute the method steps of the above embodiments in accordance with the program codes stored in the storage medium.

Regarding the specific examples in this embodiment, reference can be made to the above method embodiments and the examples described in the embodiments, and the details thereof will be omitted here.

It can be appreciated by those skilled in the art that all or some of the steps in the methods disclosed above, or the functional modules/units in the system or apparatus disclosed above, can be implemented in software, firmware, hardware and an combination thereof. In a hardware implementation, the partition among the functional modules/units as described above does not necessarily correspond to partition among physical units. For example, a physical component may have more than one function, or a function or step may be performed by more than one physical component in cooperation with each other. Some or all of the components can be implemented in software executed by a processor, such as a Digital Signal Processor (DSP) or a microprocessor, hardware or an Integrated Circuit (IC) such as Application Specific Integrated Circuit (ASIC). Such software can be distributed over a computer readable medium which may include a computer storage medium (or a non-transitory medium) or a communication medium (or a transitory medium). As well-known to those skilled in the art, the term "computer storage medium" refers to any volatile or non-volatile, removable or non-removable medium implemented in any method or technique for storing information (e.g., computer readable instructions, data structures, program modules or any other data). The computer storage medium may include, but not limited to, RAM, ROM, EEPROM, flash memory or other memory technique, CD-ROM, Digital Versatile Disc (DVD) or other optical disc storage, magnetic cassette, magnetic tape, magnetic disk storage or other magnetic storage device, or any other medium capable of storing desired information and being accessed by a computer. Further, as well-known to those skilled in the art, a communication medium typically contains computer readable instructions, data structures, program modules or other data included in modulated data signals in a carrier or other transmission mechanisms, or any information delivery medium.

While the embodiments of the present disclosure have been described above, the foregoing is only embodiments for illustrating, rather than limiting, the present disclosure. Various modifications and alternatives in forms and details can be made by those skilled in the art without departing from the spirit and scope of the present disclosure. The scope of the present disclosure is defined only by the claims as attached.

INDUSTRIAL APPLICABILITY

The embodiments of the present disclosure provide a method and an apparatus for resource allocation, capable of allocating resources for PUSCH.

What is claimed is:

1. A method for wireless communication, comprising:
transmitting, from a base station to a mobile device, a Downlink Control Information (DCI) message that includes a first value indicating a frequency-domain start position and a frequency-domain size of allocated resources for a Physical Uplink Shared Channel (PUSCH) transmission, and a second value indicating a number of time-domain units of the allocated resources for the PUSCH transmission,
wherein a length of each of the time-domain units corresponds to a number of subcarriers indicated by the frequency-domain size of the allocated resources,
wherein the first value being in a range of 0 to 11 indicates that the number of subcarriers is one, the first value being in a range of 12 to 15 indicates that the number of subcarriers is three, the first value being in a range of 16 to 17 indicates that the number of subcarriers is six, and the first value being equal to 18 indicates that the number of subcarriers is twelve, and
wherein the number of subcarriers being one indicates that the length of each of the time-domain units is 8 milliseconds, the number of subcarriers being three indicates that the length of each of the time-domain units is 4 milliseconds, the number of subcarriers being six indicates that the length of each of the time-domain units is 2 milliseconds, and the number of subcarriers being twelve indicates that the length of each of the time-domain units is 1 millisecond.

2. The method of claim 1, wherein the first value indicating the frequency-domain start position and the frequency-domain size of the allocated resources for the PUSCH transmission is represented by a positive integer number of bits in the DCI message.

3. The method of claim 1, wherein the second value indicating the number of time-domain units of the allocated resources for the PUSCH transmission is represented by three bits in the DCI message.

4. The method of claim 1, wherein the first value indicating the frequency-domain start position and the frequency-domain size of allocated resources and the second value indicating the number of time-domain units of the allocated resources are represented by a positive integer number of bits in the DCI message.

5. A method for wireless communication, comprising:
receiving, at a mobile device, a Downlink Control Information (DCI) message from a base station, wherein the DCI message includes a first value indicating a frequency-domain start position and a frequency-domain size of allocated resources for a Physical Uplink Shared Channel (PUSCH) transmission, and a second value indicating a number of time-domain units of the allocated resources for the PUSCH transmission; and
performing the PUSCH transmission using the allocated resources indicated by the DCI message,
wherein a length of each of the time-domain units corresponds to a number of subcarriers as indicated by the frequency-domain size of the allocated resources,
wherein the first value being in a range of 0 to 11 indicates that the number of subcarriers is one, the first value being in a range of 12 to 15 indicates that the number of subcarriers is three, the first value being in a range of 16 to 17 indicates that the number of subcarriers is six, and the first value being equal to 18 indicates that the number of subcarriers is twelve, and
wherein the number of subcarriers being one indicates that the length of each of the time-domain units is 8 milliseconds, the number of subcarriers being three indicates that the length of each of the time-domain units is 4 milliseconds, the number of subcarriers being six indicates that the length of each of the time-domain units is 2 milliseconds, and the number of subcarriers being twelve indicates that the length of each of the time-domain units is 1 millisecond.

6. The method of claim 5, wherein the first value indicating the frequency-domain start position and the frequency-domain size of the allocated resources for the PUSCH transmission is represented by a positive integer number of bits in the DCI message.

7. The method of claim 5, wherein the second value indicating the number of time-domain units of the allocated resources for the PUSCH transmission is represented by three bits in the DCI message.

8. The method of claim 5, wherein the first value indicating the frequency-domain start position and the frequency-domain size of allocated resources and the second value indicating the number of time-domain units of the allocated resources are represented by a positive integer number of bits in the DCI message.

9. An apparatus for wireless communication, comprising:
a processor configured to generate a Downlink Control Information (DCI) message that includes a first value indicating a frequency-domain start position and a frequency-domain size of allocated resources for a Physical Uplink Shared Channel (PUSCH) transmission, and a second value indicating a number of time-domain units of the allocated resources for the PUSCH transmission; and
a transmitter configured to transmit the DCI message to the mobile device,
wherein a length of each of the time-domain units corresponds to a number of subcarriers indicated by the frequency-domain size of the allocated resources,
wherein the first value being in a range of 0 to 11 indicates that the number of subcarriers is one, the first value being in a range of 12 to 15 indicates that the number of subcarriers is three, the first value being in a range of 16 to 17 indicates that the number of subcarriers is six, and the first value being equal to 18 indicates that the number of subcarriers is twelve, and
wherein the number of subcarriers being one indicates that the length of each of the time-domain units is 8 milliseconds, the number of subcarriers being three indicates that the length of each of the time-domain units is 4 milliseconds, the number of subcarriers being six indicates that the length of each of the time-domain units is 2 milliseconds, and the number of subcarriers being twelve indicates that the length of each of the time-domain units is 1 millisecond.

10. The apparatus of claim 9, wherein the first value indicating the frequency-domain start position and the frequency-domain size of the allocated resources for the PUSCH transmission is represented by a positive integer number of bits in the DCI message.

11. The apparatus of claim 9, wherein the second value indicating the number of time-domain units of the allocated resources for the PUSCH transmission is represented by three bits in the DCI message.

12. The apparatus of claim 9, wherein the first value indicating the frequency-domain start position and the frequency-domain size of allocated resources and the second value indicating the number of time-domain units of the allocated resources are represented by a positive integer number of bits in the DCI message.

13. An apparatus for wireless communication, comprising:
a receiver configured to receive a Downlink Control Information (DCI) message from a base station, wherein the DCI message includes a first value indicating a frequency-domain start position and a frequency-domain size of allocated resources for a Physical Uplink Shared Channel (PUSCH) transmission, and a second value indicating a number of time-domain units of the allocated resources for the PUSCH transmission; and
a processor configured to perform the PUSCH transmission using the allocated resources indicated by the DCI message,
wherein a length of each of the time-domain units corresponds to a number of subcarriers as indicated by the frequency-domain size of the allocated resources,
wherein the first value being in a range of 0 to 11 indicates that the number of subcarriers is one, the first value being in a range of 12 to 15 indicates that the number of subcarriers is three, the first value being in a range of 16 to 17 indicates that the number of subcarriers is six, and the first value being equal to 18 indicates that the number of subcarriers is twelve, and
wherein the number of subcarriers being one indicates that the length of each of the time-domain units is 8 milliseconds, the number of subcarriers being three indicates that the length of each of the time-domain units is 4 milliseconds, the number of subcarriers being six indicates that the length of each of the time-domain units is 2 milliseconds, and the number of subcarriers being twelve indicates that the length of each of the time-domain units is 1 millisecond.

14. The apparatus of claim 13, wherein the first value indicating the frequency-domain start position and the frequency-domain size of the allocated resources for the PUSCH transmission is represented by a positive integer number of bits in the DCI message.

15. The apparatus of claim 13, wherein the second value indicating the number of time-domain units of the allocated resources for the PUSCH transmission is represented by three bits in the DCI message.

16. The apparatus of claim 13, wherein the first value indicating the frequency-domain start position and the frequency-domain size of allocated resources and the second value indicating the number of time-domain units of the allocated resources are represented by a positive integer number of bits in the DCI message.

17. A non-transitory computer readable medium having code stored thereon, the code when executed by a processor, causing the processor to:
transmit, to a mobile device, a Downlink Control Information (DCI) message that includes a first value indicating a frequency-domain start position and a frequency-domain size of allocated resources for a Physical Uplink Shared Channel (PUSCH) transmission, and a second value indicating a number of time-domain units of the allocated resources for the PUSCH transmission,
wherein a length of each of the time-domain units corresponds to a number of subcarriers indicated by the frequency-domain size of the allocated resources,
wherein the first value being in a range of 0 to 11 indicates that the number of subcarriers is one, the first value being in a range of 12 to 15 indicates that the number of subcarriers is three, the first value being in a range of 16 to 17 indicates that the number of subcarriers is six, and the first value being equal to 18 indicates that the number of subcarriers is twelve, and
wherein the number of subcarriers being one indicates that the length of each of the time-domain units is 8 milliseconds, the number of subcarriers being three indicates that the length of each of the time-domain units is 4 milliseconds, the number of subcarriers being six indicates that the length of each of the time-domain units is 2 milliseconds, and the number of subcarriers being twelve indicates that the length of each of the time-domain units is 1 millisecond.

18. The non-transitory computer readable medium of claim 17, wherein the first value indicating the frequency-domain start position and the frequency-domain size of the allocated resources for the PUSCH transmission is represented by a positive integer number of bits in the DCI message.

19. The non-transitory computer readable medium of claim 17, wherein the second value indicating the number of time-domain units of the allocated resources for the PUSCH transmission is represented by three bits in the DCI message.

20. A non-transitory computer readable medium having code stored thereon, the code when executed by a processor, causing the processor to:
receive a Downlink Control Information (DCI) message from a base station, wherein the DCI message includes a first value indicating a frequency-domain start position and a frequency-domain size of allocated resources for a Physical Uplink Shared Channel (PUSCH) transmission, and a second value indicating a number of time-domain units of the allocated resources for the PUSCH transmission; and
perform the PUSCH transmission using the allocated resources indicated by the DCI message,
wherein a length of each of the time-domain units corresponds to a number of subcarriers as indicated by the frequency-domain size of the allocated resources,
wherein the first value being in a range of 0 to 11 indicates that the number of subcarriers is one, the first value being in a range of 12 to 15 indicates that the number of subcarriers is three, the first value being in a range of 16 to 17 indicates that the number of subcarriers is six, and the first value being equal to 18 indicates that the number of subcarriers is twelve, and wherein the number of subcarriers being one indicates that the length of each of the time-domain units is 8 milliseconds, the number of subcarriers being three indicates that the length of each of the time-domain units is 4 milliseconds, the number of subcarriers being six indicates that the length of each of the time-domain units is 2 milliseconds, and the number of subcarriers being twelve indicates that the length of each of the time-domain units is 1 millisecond.

21. The non-transitory computer readable medium of claim 20, wherein the first value indicating the frequency-domain start position and the frequency-domain size of the allocated resources for the PUSCH transmission is represented by a positive integer number of bits in the DCI message.

22. The non-transitory computer readable medium of claim 20, wherein the second value indicating the number of time-domain units of the allocated resources for the PUSCH transmission is represented by three bits in the DCI message.

* * * * *

UNITED STATES PATENT AND TRADEMARK OFFICE
CERTIFICATE OF CORRECTION

PATENT NO. : 10,499,392 B2  
APPLICATION NO. : 15/990546  
DATED : December 3, 2019  
INVENTOR(S) : Weiwei Yang et al.

It is certified that error appears in the above-identified patent and that said Letters Patent is hereby corrected as shown below:

In the Drawings

In Fig. 2, for Tag "10", in Line 2, delete "Allcation" and insert -- Allocation --, therefor.

In the Specification

In Column 3, Line 11, delete "in a" and insert -- is a --, therefor.

In Column 3, Line 20, delete "in a" and insert -- is a --, therefor.

In Column 4, Line 9, delete "in a" and insert -- is a --, therefor.

In Column 6, Line 67, delete "in a" and insert -- is a --, therefor.

In Column 7, Line 8, delete "in a" and insert -- is a --, therefor.

In Column 10, Line 8, delete "in a" and insert -- is a --, therefor.

In Column 10, Line 16, delete "in a" and insert -- is a --, therefor.

In Column 12, Line 67, delete "are A different" and insert -- are a different --, therefor.

In Column 23, Line 9, delete "in a" and insert -- is a --, therefor.

In Column 23, Line 17, delete "in a" and insert -- is a --, therefor.

Signed and Sealed this  
First Day of September, 2020

Andrei Iancu  
*Director of the United States Patent and Trademark Office*